United States Patent

[11] 3,550,987

| [72] | Inventor | Gilbert C. Dickey |
| --- | --- | --- |
| | | Genoa, Ohio |
| [21] | Appl. No. | 721,671 |
| [22] | Filed | Apr. 16, 1968 |
| [45] | Patented | Dec. 29, 1970 |
| [73] | Assignee | G. C. Dickey Corporation |
| | | Fremont, Ohio |
| | | a corporation of Ohio |

[54] RESILIENT SEALING APPARATUS
20 Claims, 9 Drawing Figs.

[52] U.S. Cl. .................................................... 277/10,
277/207, 277/226
[51] Int. Cl. ........................................................ F16j 15/16,
F16l 21/02
[50] Field of Search........................................... 277/9, 10,
11, 34.3, 226, 207A, 207; 285/O-ring

[56] References Cited
UNITED STATES PATENTS

| 1,517,143 | 11/1924 | Almquist ...................... | 277/10 |
| --- | --- | --- | --- |
| 1,918,478 | 7/1933 | Laycock ...................... | 277/10 |
| 2,445,952 | 7/1948 | Lagergren ...................... | 277/10 |
| 2,648,554 | 8/1953 | Gilbert, Sr. ...................... | 277/34.3X |
| 2,945,715 | 7/1960 | Burrell ...................... | 277/10 |
| 3,310,315 | 3/1967 | Best.............................. | 277/11 |
| 3,406,409 | 10/1968 | Burns........................... | 277/207X |
| 1,921,555 | 8/1933 | Welsh........................... | 277/10X |

FOREIGN PATENTS

| 1,100,402 | 2/1961 | Germany...................... | 277/207A |
| --- | --- | --- | --- |
| 1,407,870 | 6/1965 | France ......................... | 277/34.3 |

*Primary Examiner*—Samuel C. Rothberg
*Attorney*—Myron E. Click

ABSTRACT: Apparatus particularly useful for sealing a joint in a female-male-type connector comprising a resilient sealing element formed for press-fit insertion into sealing position in a female coupling. The sealing element has a central opening formed therein and a finger-pull element attached thereto and extending into the central opening to aid in the removal of the sealing element from the female coupling. Resilient means on the peripheral wall of the sealing element engage an inner wall or recess of the female coupling to hold the sealing element in place in the female coupling.

PATENTED DEC 29 1970 3,550,987

INVENTOR.
GILBERT C. DICKEY
BY
Myron E. Click
ATTORNEY

PATENTED DEC 29 1970

INVENTOR.
GILBERT C. DICKEY
BY
Myron E. Click
ATTORNEY

RESILIENT SEALING APPARATUS

In the past difficulties have arisen in providing a seal between two pipes, conduits or the like which have passages formed therein for carrying fluid, etc. The walls of the passages terminate in sealing surfaces formed transversely to the passages at the ends of the pipes or conduits to be joined. This invention is particularly applicable to either "quick-connect" or "screw-on" couplings in which a female portion of the coupling has an inner circumferentially extending recess formed adjacent a transverse sealing surface in the female portion of the connector.

In couplings of this type, such as a hose end connection from a tank truck, the sealing element between the ends of the conduits has generally been a simple annular gasket which is loosely carried within the female part of the connector. The gasket is made of gasket materials that are resilient, flexible, and have the ability to seal the sealing surface, the material preferably being substantially impervious to the product being carried in the conduits so that no leakage occurs through the material.

Quite frequently, however, when utilizing the "quick-disconnect" or "screw-on" coupling and replacing the hose or conduit on its carrier, the annular gasket is jarred loose from or dropped out of the female portion of the coupling. Further, since the annular gasket is carried loosely within the female portions of the coupling, difficulties arise in insuring that the gasket is properly aligned so that the sealing surfaces of the two conduits have good contact with both sides of the gasket. To overcome this problem the gasket is usually made with opposing transversely extending receiving surfaces which are considerably larger than necessary with a substantial tolerance in the dimensions of the outside diameter and inside diameter of the gasket to provide sufficient overlap to insure engagement between sealing surfaces of the coupling and receiving surfaces of the gasket to achieve a seal. Thus, material is wasted in the manufacture of the gasket and in some instances the flow opening through the gasket is substantially reduced, thus substantially reducing the amount of product that can flow through the gasket.

As a result of the loose carriage of the gasket, and the resulting plurality of different seat indentations thereby formed on the gasket it is possible, as the gasket material ages, for leaks to occur as the result of interconnecting the passages formed by overlapping previous seat indentations.

The most satisfactory gaskets to date have been made from leather or certain types of rubber, depending upon the fluid being carried in the passages, and may be subject to both dry and wet types of rot. Use in connection with certain strong solvents and chemicals cause the prior art gaskets to swell or expand and they must be discarded. If, as in many cases, use is continued of a gasket that has expanded, the cam arms on a "quick-coupler" become very hard to close and eventually excessive wear will result on the cams and they will no longer close to provide a tight enough fit to prevent leaking. If, after the cam arms wear, a new gasket is finally substituted for the expanded gasket then the wear on the cam arms again prevents the application of sufficient force on the gasket to prevent a leak.

Accordingly, it is an object of this invention to provide improved sealing apparatus or elements which may be retained in a radially and longitudinally aligned seating position adjacent the sealing surface of passage wall of one of the conduits.

It is a further object of this invention to provide an improved sealing means which is easy to insert into a female coupling and has special means for aiding in the easy removal thereof.

A still further object of this invention is to provide an improved sealing element which will allow easier operation of cam arms on "quick-coupler" connectors and will prolong the life of the cam arms while providing an excellent seal for an extended period past the ordinary life of a gasket.

Yet another object of this invention is to provide an improved sealing element which will provide an excellent seal in a "quick-coupler" connector whether or not the cam arms of the connector are worn.

In carrying out the above objects the present invention features apparatus for sealing a joint between pipes, conduits or the like having passages therein terminating in opposing sealing surfaces, the joint including a female connector portion having on the inner wall thereof recess means, usually in the form of an inner circumferential recess formed adjacent one of the sealing surfaces, and a male connector portion, carrying the other sealing surface, to be received by the female portion. A sealing element of compressible material may be disposed between the sealing surfaces and has a central opening therein sized to provide substantially the same flow between the passages as can flow in the passages themselves. Resilient means on the periphery of the sealing element are adapted to be urged into and extend radially into the recess of the female connector portion to hold the sealing element in longitudinal alignment adjacent a sealing surface. The sealing element advantageously includes a finger-pull element attached to the sealing element and extending into the central opening thereof.

The peripheral resilient means may comprise a plurality of radially extending flanges. An arched peripheral wall of the sealing element may form the peripheral resilient means. The peripheral resilient means may extend into and abut the back of the recess to keep the sealing element axially centered. Alternatively, the sealing element may include means extending longitudinally or axially from the peripheral wall thereof to engage the wall of the female connector to maintain the sealing element in transverse or axial alignment in the connector. The longitudinal means may extend completely around the circumference of the sealing element and have a cross section which tapers from the base adjacent the sealing element toward the wall engaging side to accept a beveled male connector portion. The peripheral wall of the sealing element is advantageously tapered to aid in insertion of the sealing element into a female coupling.

The sealing element may have a hollow interior and be formed of resilient material to permit walls thereof to be flexed in a spring-type action. The peripheral wall of the sealing element may have aperture means formed therein to permit the entry and exit of air into and out of the interior thereof to permit a greater compressibility and thus a greater spring action of the peripheral wall and the inner wall thereof surrounding the central opening. The location of the aperture means in the peripheral wall prevents the entry of material carried by the passages into the hollow interior of the sealing element.

The sealing element has transverse receiving faces on opposite sides thereof adapted to abut the sealing surfaces. The faces may have a plurality of annular ribs formed therein leaning toward and adapted to flex toward the central opening, when compressed by the sealing surfaces. The hollow interior of a sealing element aids the flexing capacity of the annular ribs to provide a good seal with a relatively light compressive force, thereby enabling a good seal whether the cam arms on a "quick-coupler" connector are worn or not.

The finger-pull element is shown herein in a variety of forms. A first embodiment illustrates a tab having one end attached to the sealing element and finger engaging means formed in the other end. The finger engaging means may comprise a finger hole formed in the tab, a knob secured at the other end of the tab, or a transverse member secured at the other end of the tab. Alternatively, the finger-pull element may comprise a member connected between separated points of the wall of the central opening. The finger-pull member thus attached at separated points is advantageously arched toward the wall of the central opening to clear the central opening of as much obstruction as possible. The finger-pull element is resilient and will separate from its arched and wall adjacent position to permit hooking a finger around the member.

Other objects, advantages and features of this invention will become apparent when the following description is taken in conjunction with the accompanying drawings, in which.

Figure 1:
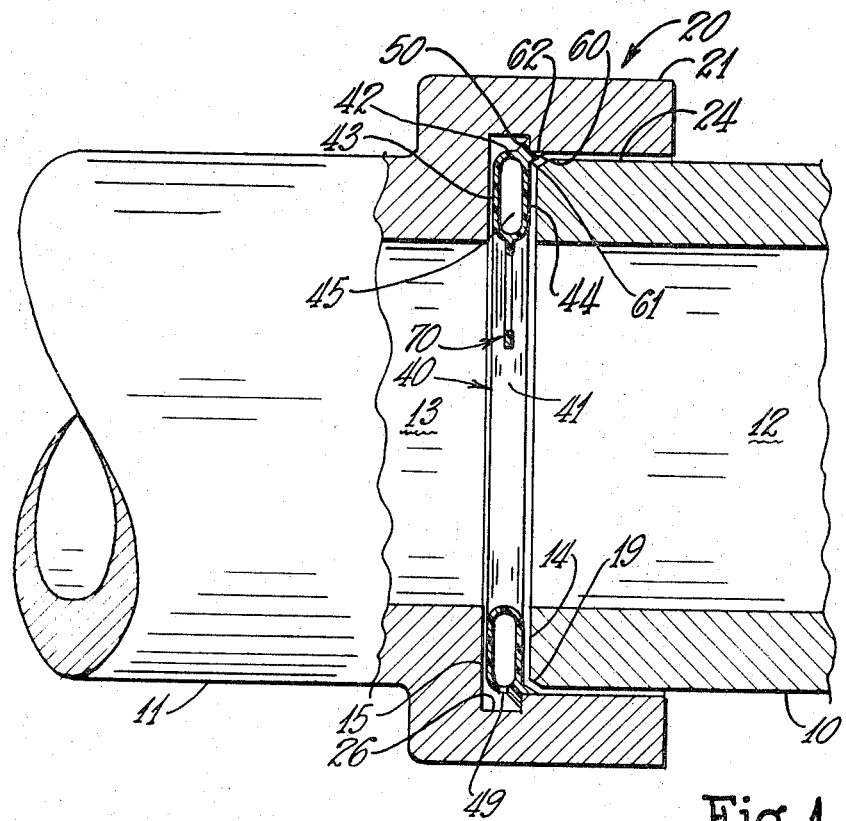
FIG. 1 is a cross-sectional view of apparatus embodying the teachings of this invention.

Referring to FIG. 1 there is shown conduits 10 and 11 having passages 12 and 13 formed therein, the walls of the passages terminating in opposed sealing surfaces 14 and 15. The conduits 10 and 11 are representative of pipes, hoses, or the like. Although not shown in detail, since the apparatus is well known in the art, a coupling means is represented generally at 20, having a female portion 21 with a circumferential recess 26 formed in the inner wall thereof adjacent the sealing surface 15. An end of the conduit 24 represents the male portion of a "quick-coupler" or "screw-one" connector.

The coupling is illustrative only of the many types of couplings with which the invention may be utilized. Sealing apparatus embodying the teachings of this invention is indicated generally at 40 and comprises an annular element having a central opening formed therein. Inner wall 41 faces and surrounds the central opening, peripheral wall 42 faces the female coupling, and faces or walls 43, 44 on opposite sides of element 40 are adapted to abut against sealing surfaces 15, 14.

Means 50, advantageously of the same resilient material as the remainder of the body of the sealing element, on the periphery or peripheral wall 42 of the element 40 is adapted to be urged into and extend radially into the recess 26 of the female connector portion 21 to hold the sealing element in transverse or axial alignment adjacent sealing surface 15. The means 50 may extend around the entire peripheral wall 42, however it has been found that the peripheral resilient means 50 will perform satisfactorily when formed as a plurality of radially extending flanges as noted at 51 in FIG. 2.

Figure 2:
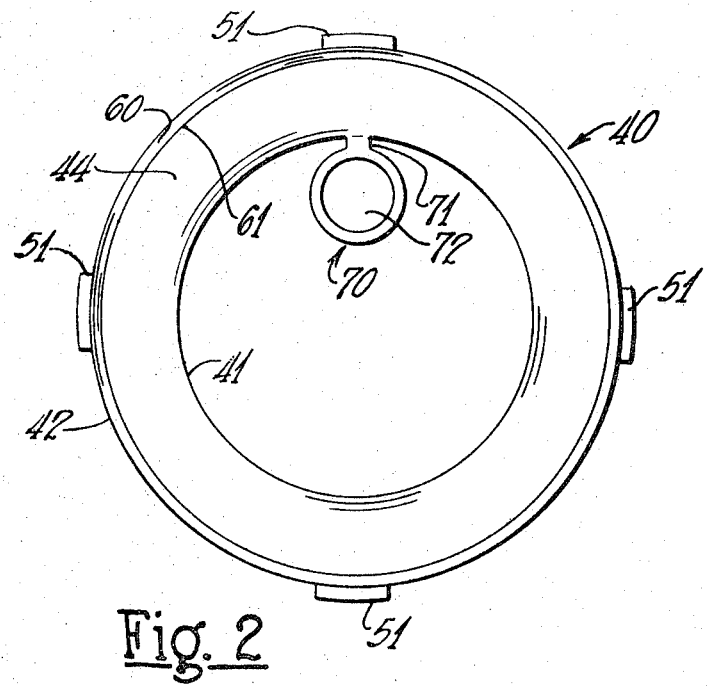
FIG. 2 is a side elevational view of the sealing element illustrated in FIG. 1.

Means 60 extends longitudinally from the periphery of the sealing element 40 and engages the wall of the female connector to maintain the sealing element in longitudinal alignment in the connector. The longitudinal means 60 may extend around the complete circumference of the sealing element, as shown in FIG. 2, or be divided into segments. The cross section of the longitudinal means tapers from a base portion 61 adjacent the sealing element 40 toward the wall engaging side 62 to provide a sloping or inclined surface which accepts and mates with a beveled male connector portion indicated at 19. This arrangement prevents the crushing of the longitudinally extending means by the male connector portion 24 and, when the tapered portion of the longitudinal extending means mates with the beveled portion 19 of the male connector portion, an additional seal is provided.

The sealing element advantageously has a hollow interior 45, the walls being formed of a resilient material to permit the peripheral and inner walls 42, 41 to be flexed in a spring-type action to insure an excellent seal without regard to the state of wear of the cam arms of a "quick-coupler" connector.

The peripheral wall 42 of the sealing element 40 advantageously has aperture means 49 formed therein to permit the entry and exit of air into and out of the interior thereof to permit a larger flex range for the sealing element. The location of the aperture means in the peripheral wall 42 prevents the entry of material or debris being carried by the passages into the interior of the sealing element.

A finger-pull element is indicated generally at 70 and is attached to the sealing element, in this instance on the inner wall 41 thereof, and extends into the central opening. This embodiment of the finger-pull element includes a tab 71 having one end attached to the sealing element and a finger hole 72 formed in the other end thereof.

If the radially extending flange means is as shown in the embodiment illustrated in FIG. 2, wherein a plurality of separated flange means are utilized, it is advantageous to locate the finger-pull member on the inner wall 41 opposite one of the flange means 51. Force is then applied to the sealing element 40 directly opposite a flange 51 enabling the removal of the flange 51 from the recess 26 with less force than would be required if the finger-pull element were disposed intermediate the flange members. Although four flange elements 51 are illustrated in FIG. 2 experimental results indicate that with most materials only two, preferably opposed, flange elements of the type indicated at 51 are required. The fewer flange elements utilized the greater the ease of removal of the sealing element from the female connector 21.

Figure 3:
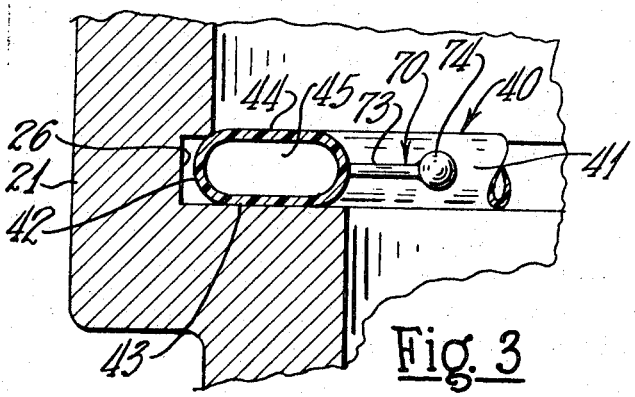
FIG. 3 is an enlarged cross-sectional partial view of a second embodiment of the teachings of this invention.
Figure 4:
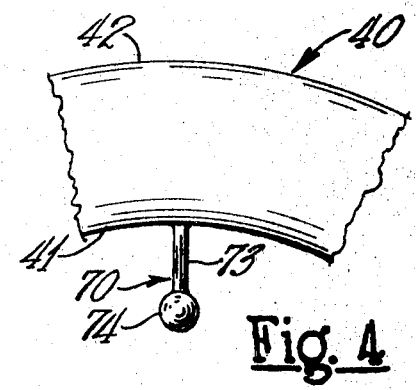
FIG. 4 is an elevational view of the finger-pull element illustrated in FIG. 3.

Referring to FIGS. 3 and 4 there is illustrated a second embodiment of the teachings of this invention in which the peripheral wall 42 is arched so that it extends into the recess 26, thus forming the peripheral resilient means for holding the sealing element 40 in place in the female connector 21. This embodiment may have a hollow interior as indicated at 45 and may have aperture means formed in the peripheral wall 42 to extend the flex range of the sealing element 40. Although the cross section of element 40 is shown as oval-shaped, any configuration having a peripheral wall arching out toward recess 26 is intended to be covered herein, e.g. a circular cross section.

Referring particularly to FIG. 4 a second embodiment of the finger-pull element is illustrated in which a tab 73 has one end attached to the inner wall 41 of the sealing element 40 and a knob 74 attached to the other end thereof. The finger-pull element may be utilized by hooking a finger around the tab body 73, the knob portion 74 preventing the hooked finger from sliding off the tab 73.

Figure 5:
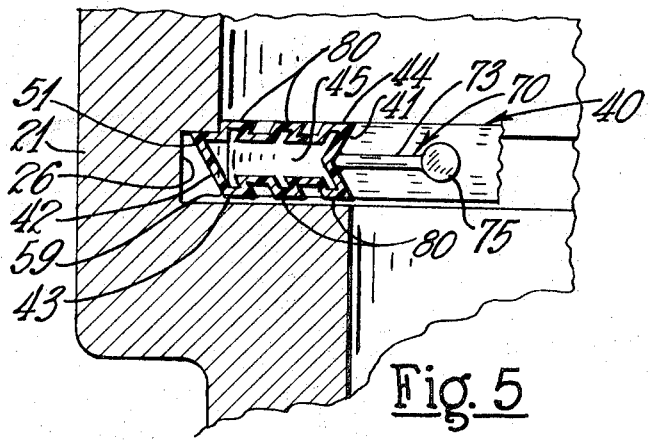
FIG. 5 is an enlarged cross-sectional partial view of a third embodiment of the teachings of this invention.
Figure 6:
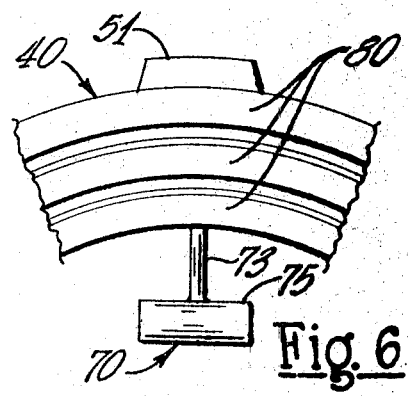
FIG. 6 is an elevational view of the finger-pull element in FIG. 5 and a section of the sealing element of FIG. 5.

Referring to FIGS. 5 and 6 there is illustrated still another embodiment of the teachings of this invention in which the faces 43 and 44 have a plurality of annular ribs 80 formed therein leaning toward and adapted to flex toward the central opening when compressed by the sealing surfaces 14 and 15. The use of the annular ribs, preferably in combination with an element having a hollow interior 45, again extends the flex range of the sealing element 40 to provide a good seal with a relatively light compressive force or with a heavier compressive force.

It is to be noted in this embodiment that the radially extending means 51 extends into the recess 26 so that it may abut the back wall of the recess 26 and hold the sealing element 40 in an aligned transverse or radial position. The peripheral wall 42 is tapered from a lower point 59 to the flange 51 to enable the element 40 to be inserted into the female coupling 21 more easily.

The finger-pull element 70 in this embodiment again includes a tab element 73 connected to the inner wall 41 of the element 40 and has a transverse member 75 secured to the other end thereof. As in FIG. 4 the finger may be hooked around tab body 73 to pull the element 40 out of the female coupling 21, the member 75 preventing the hooked finger from sliding from tab 73.

Figure 7:
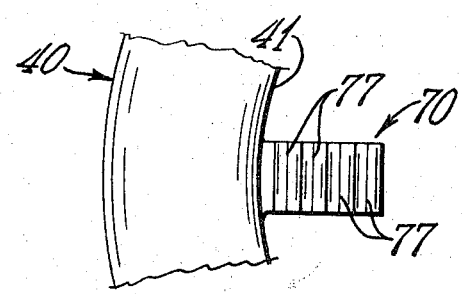
FIG. 7 is an elevational view of a fourth embodiment of a finger-pull element.
Figure 8:
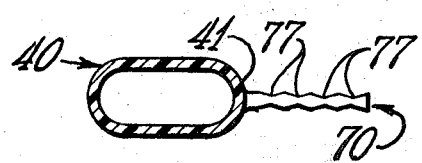
FIG. 8 is a side elevational view of the finger-pull element illustrated in FIG. 7.

Referring to FIGS. 7 and 8 there is illustrated a fourth embodiment of a finger-pull element in which a tab portion 70 extends from the inner wall 41 of the element 40. Corrugations 77 on the upper and lower sides of the finger-pull 70 enable grasping and holding the finger tab 70 between a thumb and a finger.

Figure 9:
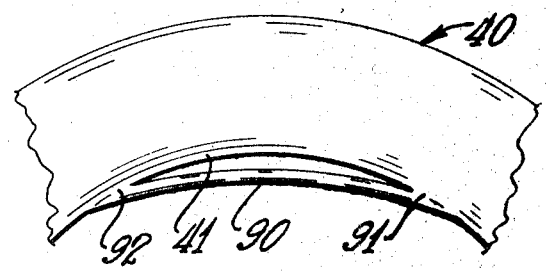
FIG. 9 is an elevational view of a fifth embodiment of a finger-pull element.

Referring to FIG. 9 there is illustrated a fifth embodiment of the teachings of this invention in which a finger-pull element 90 is secured at the ends 91 and 92 thereof to the inner wall 41 of the sealing element 40. The element 90 is advantageously arched toward the wall 41 to remove as much obstruction from the central opening of the element as possible. The element 90 is advantageously of a resilient material so that the element 90 may be urged away from its wall adjacent position to permit insertion of the finger into the aperture defined by the wall 41 and the element 90, to permit the application of force to remove the element 40.

There has thus been disclosed herein a sealing element for press-fit insertion into sealing position in a female coupling, which element has a central opening formed therein and also has a finger-pull element attached thereto and extending into the central opening to aid in the removal of the sealing element from the female coupling. The element advantageously further includes resilient means on a peripheral wall thereof to engage an inner wall or a recess formed in the inner wall of female coupling to hold the sealing element in the female coupling.

It is apparent, that within the scope of this invention, modifications and different arrangements may be made other than is herein disclosed. The present disclosure therefore is illustrative only, the invention comprehending all variations thereof.

I claim:

1. Apparatus for sealing a joint between pipes, conduits, or the like having passages therein terminating in opposing sealing surfaces formed transversely to the passages, the joint including a female connector portion having recess means formed in the inner wall thereof adjacent one of the transverse sealing surfaces and a removably securable male connector portion carrying the other transverse sealing surface to be selectively inserted into and removed from the female portion, consisting of a sealing element of compressible material for insertion into said female connector and having transversely extending and opposing receiving sealing surfaces formed thereon for disposition between the transverse sealing surfaces of said connector portions and having a central opening formed axially through said opposing receiving surfaces and sized to provide substantially the same flow between the passages as can flow in the passages themselves, means on the periphery of said sealing element to be resiliently urged into and extend radially outwardly past the inner wall of and into the recess means formed in the female connector portion when the sealing element is in sealing position to hold a receiving surface of said sealing element in axial alignment adjacent a sealing surface of said female connector and to retain said element in said female connector portion.

2. Apparatus as defined in claim 1 in which said peripheral resilient means comprises a plurality of radially extending flanges.

3. Apparatus as defined in claim 1 in which an arched peripheral wall of said sealing element forms said peripheral resilient means.

4. Apparatus as defined in claim 1 in which said peripheral resilient means extends into and abuts the back of said recess to keep said sealing element transversely centered.

5. Apparatus for sealing a joint between pipes, conduits, or the like having passages therein terminating in opposing sealing surfaces formed transversely to the the passages, the joint including a female connector portion having recess means formed in the inner wall thereof adjacent one of the transverse sealing surfaces and a male connector portion carrying the other transverse sealing surface to be received by the female portion, comprising a sealing element of compressible material having transversely extending and opposing receiving surfaces formed thereon for disposition between the transverse sealing surfaces of said connector portions and having a central opening formed axially through said opposing receiving surfaces and sized to provide substantially the same flow between the passages as can flow in the passages themselves, means on the periphery of said sealing element adapted to be resiliently urged into and extend radially outwardly into the recess means formed in the female cone connector portion to hold a receiving surface of said sealing element in axial alignment adjacent a sealing surface of said female connector and to retain said element in said female connector portion, and means extending longitudinally from the periphery of said sealing element to engage the wall of the female connector to maintain said sealing element in transverse alignment in the connector.

6. Apparatus as defined in claim 5 in which said longitudinal means extends around the circumference of the sealing element, the cross section tapering from the base adjacent the sealing element toward the wall engaging side to accept a beveled male connector portion.

7. Apparatus as defined in claim 1 in which said sealing element has a hollow interior and is formed of resilient material to permit walls thereof to be flexed in a spring-type action.

8. Apparatus as defined in claim 7 in which the peripheral wall of said sealing element has aperture means formed therein to permit the entry and exit of air into and out of the interior thereof, the location of said aperture means preventing the entry of material carried by the passages.

9. Apparatus as defined in claim 1 in which said sealing element has faces on opposite sides thereof adapted to abut the sealing surfaces, said faces having a plurality of annular ribs formed thereon leaning toward and adapted to flex toward the central opening when compressed by said sealing surfaces.

10. Apparatus as defined in claim 9 in which said sealing element has a hollow interior to aid in the flexing capacity of the annular ribs to provide a good seal with a relatively light compressing force.

11. Apparatus for sealing a joint between pipes, conduits, or the like having passages therein terminating in opposing sealing surfaces formed transversely to the passages, the joint including a female connector portion having recess means formed in the inner wall thereof adjacent one of the transverse sealing surfaces and a male connector portion carrying the other transverse sealing surface to be received by the female portion, comprising a sealing element of compressible material having transversely extending and opposing receiving surfaces formed thereon for disposition between the transverse sealing surfaces of said connector portions and having a central opening formed axially through said opposing receiving surfaces and sized to provide substantially the same flow between the passages as can flow in the passages themselves, means on the periphery of said sealing element adapted to be resiliently urged into and extend radially outwardly into the recess means formed in the female connector portion to hold a receiving surface of said sealing element in axial alignment adjacent a sealing surface of said female connector and to retain said element in said female connector portion, and a finger-pull element attached to said sealing element and extending into said central opening thereof.

12. Apparatus as defined in claim 11 in which said finger-pull element includes a tab having one end attached to said sealing element and finger engaging means formed in the other end.

13. Apparatus as defined in claim 12 in which said finger engaging means comprises a finger hole formed in said tab.

14. Apparatus as defined in claim 12 in which said finger engaging means comprises a knob secured at the other end of said tab.

15. Apparatus as defined in claim 12 in which said finger engaging means comprises a transverse member secured at the other end of said tab.

16. Apparatus as defined in claim 11 in which said finger-pull element comprises a member connected between separated points of the wall of said central opening.

17. Apparatus as defined in claim 16 in which said finger-pull member is arched toward the wall of said central opening to clear the central opening of obstruction.

18. Apparatus as defined in claim 1 in which the peripheral wall of said sealing element is tapered to aid in insertion of said sealing element into a female coupling.

19. A resilient sealing element for press-fit insertion into sealing position in a female coupling, said element having opposed and transversely extending receiving surfaces for sealing engagement with transversely extending sealing surfaces of a coupling and a central opening formed axially through said opposed transverse receiving surfaces and sized to permit substantially the same flow therethrough as can flow through the coupling, and a finger-pull element attached to the wall of said central opening and extending radially inwardly into said central opening to aid in the removal of said sealing element from the female coupling.

20. A sealing element as defined in claim 19 which further includes resilient means on a peripheral wall of said sealing element to engage an inner wall of said female coupling to hold said sealing element in said female coupling.